US012071324B2

(12) United States Patent
Haapaniemi et al.

(10) Patent No.: US 12,071,324 B2
(45) Date of Patent: Aug. 27, 2024

(54) CONSTRUCTION TIME USE ELEVATOR SHAFT ELEMENT, ELEVATOR ARRANGEMENT AND METHOD

(71) Applicant: Kone Corporation, Helsinki (FI)

(72) Inventors: Markku Haapaniemi, Helsinki (FI); Jukka Laitinen, Helsinki (FI); Matti Rasanen, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/168,053

(22) Filed: Feb. 13, 2023

(65) Prior Publication Data

US 2023/0183042 A1 Jun. 15, 2023

Related U.S. Application Data

(63) Continuation of application No. PCT/FI2020/050569, filed on Sep. 4, 2020.

(51) Int. Cl.
*B66B 11/00* (2006.01)
*B66B 9/187* (2006.01)
(Continued)

(52) U.S. Cl.
CPC .......... *B66B 11/0005* (2013.01); *B66B 9/187* (2013.01); *B66B 11/0045* (2013.01);
(Continued)

(58) Field of Classification Search
CPC .......... B66B 11/005; B66B 9/187; B66B 9/16
See application file for complete search history.

(56) References Cited

U.S. PATENT DOCUMENTS 6,079,520 A 6/2000 Black et al.
8,800,724 B1 * 8/2014 Foster .................... B66B 19/00 187/414
(Continued)

FOREIGN PATENT DOCUMENTS

CN 105035678 A 11/2015
CN 107651529 A * 2/2018
(Continued)

OTHER PUBLICATIONS

Tomlinson, Angie: Comemercialrealestate.com.au : “North Sydney heritage warehouse offices Bay 9 built on history of Sydney Harbour Bridge” Apr. 15, 2019.*
(Continued)

*Primary Examiner* — Diem M Tran
(74) *Attorney, Agent, or Firm* — Harness, Dickey & Pierce, P.L.C.

(57) ABSTRACT

An elevator shaft element, an elevator arrangement and a method of a construction time use elevator. The elevator shaft element comprises a frame module arranged for receiving an elevator car therein. The frame module is constructed from a transport and/or storage unit, comprising side walls, a bottom wall and a roof wall. The unit is arrangeable vertically such that said side walls, bottom wall and upper wall of the unit define an inner space of the elevator shaft. The side wall, the bottom wall or the upper wall of the transport and/or storage unit is opened at a length more than a floor height of a building for providing an opening for one or more landing doors, the opening having a first side-edge and a second side-edge parallel to longitudinal direction of the transport and/or storage unit. The elevator shaft element further comprises at least one stiffening beam arranged to be fixed to the opening and extending from the first side-edge to the second side-edge.

14 Claims, 4 Drawing Sheets

(51) Int. Cl.
*B66B 13/30* (2006.01)
*B66B 19/00* (2006.01)

(52) U.S. Cl.
CPC .......... *B66B 11/006* (2013.01); *B66B 13/301* (2013.01); *B66B 13/306* (2013.01); *B66B 19/00* (2013.01)

(56) References Cited

U.S. PATENT DOCUMENTS

| | | | | |
|---|---|---|---|---|
| 2007/0084135 | A1 | 4/2007 | Ritter et al. | |
| 2020/0217087 | A1 | 7/2020 | Greschbach | |
| 2022/0024723 | A1 * | 1/2022 | Laitinen | B66B 11/0005 |

FOREIGN PATENT DOCUMENTS

| | | | | |
|---|---|---|---|---|
| CN | 112193967 | A | * | 1/2021 |
| EP | 1780162 | A1 | | 5/2007 |
| JP | 2011111296 | A | | 6/2011 |
| KR | 20140121170 | A | * | 10/2014 |
| KR | 101923924 | B1 | | 11/2018 |
| NL | 2002869 | C2 | | 11/2010 |
| NL | 2005305 | C2 | | 3/2012 |
| WO | WO-2022242830 | A1 | * | 11/2022 |

OTHER PUBLICATIONS

International Search Report for International Application No. PCT/FI2020/050569 dated Aug. 5, 2021.
Written Opinion of the International Searching Authority for International Application No. PCT/FI2020/050569 dated Aug. 5, 2021.
Providsional Opinion for International Application No. PCT/FI2020/050569 dated May 28, 2021.

* cited by examiner

CONSTRUCTION TIME USE ELEVATOR SHAFT ELEMENT, ELEVATOR ARRANGEMENT AND METHOD

CROSS-REFERENCE TO RELATED APPLICATION

This application is a continuation of PCT International Application No. PCT/FI2020/050569 which has an International filing date of Sep. 4, 2020, the entire contents of which are incorporated herein by reference.

BACKGROUND

The invention relates to an elevator shaft element of a construction time use elevator.

The invention further relates to an elevator arrangement of a construction time use elevator.

The invention still further relates to a method for constructing an elevator shaft of a construction time use elevator.

Construction time use elevators are temporarily-installed elevators or hoists used for transporting passengers and materials vertically in and out of a building during its construction.

A problem with known construction time use elevators is that their structure is not very stable. Therefore, speed of elevator cars must be limited and capacity limited, thus they provide slow logistics. Furthermore, known construction time use elevators have typically an open structure that may cause a disagreeable experience to passengers using the elevator.

BRIEF DESCRIPTION

Viewed from a first aspect, there can be provided an elevator shaft element of a construction time use elevator, comprising a frame module arranged for receiving an elevator car therein, the frame module being constructed from a transport and/or storage unit, comprising side walls, a bottom wall and a roof wall, the unit being arrangeable vertically such that said side walls, bottom wall and upper wall of the unit define an inner space of the elevator shaft, and wherein the side wall, the bottom wall or the upper wall of the transport and/or storage unit is opened at a length more than a floor height of a building for providing an opening for one or more landing doors, the opening having a first side-edge and a second side-edge parallel to longitudinal direction of the transport and/or storage unit, the elevator shaft element further comprising at least one stiffening beam arranged to be fixed to the opening and extending from the first side-edge to the second side-edge.

Thereby an elevator shaft element providing a stable but still easily and fast constructed and demolished elevator may be achieved.

Viewed from a second aspect, there can be provided an elevator arrangement, comprising at least one shaft element as defined above, and at least one elevator car.

Thereby an elevator arrangement of a construction time use elevator having a stable structure and having high logistics capacity may be achieved.

Viewed from a further aspect, there can be provided a method for constructing an elevator shaft of a construction time use elevator, the method comprising prefabricating elevator shaft elements, the element comprising a frame module constructed from a transport and/or storage unit, comprising side walls, and a bottom wall and a roof wall, opening the side wall, the bottom wall or the upper wall of the transport and/or storage unit at a length more than a floor height of a building for providing an opening for one or more landing doors, the opening having a first side-edge and a second side-edge parallel to longitudinal direction of the transport and/or storage unit, the method further comprising arranging at least one stiffening beam to the opening extending from the first side-edge to the second side-edge for stiffening the structure of the frame module.

Thereby a method for constructing an elevator shaft being fast and economically tempting may be achieved.

The elevator shaft, the arrangement and the method are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In an embodiment, the frame module is arranged to constitute an inner perimeter and an outer perimeter of a load bearing structure adapted for bearing the loads caused by operating the elevator. An advantage is that an elevator shaft that is able to be constructed quickly and with low cost may be achieved.

In an embodiment, the frame module is constructed from a shipping container. An advantage is that shipping containers have a very strong structure and, furthermore, they are easily available all over the world.

In an embodiment, the opening for the landing door (s) extends over all the length of the transport and/or storage unit. An advantage is that a the height position of the landing doors can be freely adjusted according to a floor height.

In an embodiment, the stiffening beam is arranged to serve as or support to a threshold for a landing door opening being located above thereof, and/or a head for a landing door opening being located below thereof. An advantage is the structure of the elevator shaft element can be simplified.

In an embodiment, the stiffening beam comprises fixing means formed for a releasably attachment of the stiffening beam with the frame module, and the frame module comprises counter fixing means for receiving the fixing means, providing an adjustment of a height position for the stiffening beam according to the floor height of the building. An advantage is that the height position is simple and quick to adjust and the range of application of the element can be extended easily.

In an embodiment, the opening is arranged in the bottom wall or the roof wall of the transport and/or storage unit, preferably in the roof wall. An advantage is that then side walls of the transport and/or storage unit constitutes side walls of the elevator shaft, and a symmetrical structure of the load bearing structure of the elevator shaft is achieved.

In an embodiment, the elevator shaft element comprises a loading door on the opposite wall in relation to the opening. An advantage is that when landing doors are arranged towards the building, loading and unloading of an elevator car can be done easily on opposite side of the elevator shaft element.

In an embodiment, a door leaf is arranged in the opening, preferably a guillotine type of door leaf. An advantage is that safety of the elevator may be enhanced.

In an embodiment, the elevator shaft element comprises elevator car guides for guiding movement of the elevator car in the elevator shaft element, said elevator car guides being attached to at least one of the side walls of the transport and/or storage unit. An advantage is that the roof wall and the floor wall can be kept free of said guides and size of opening arranged in the roof wall or the floor wall can be maximized.

In an embodiment, the elevator shaft element comprises a machinery for driving moving elevator components, said moving elevator components comprising at least the elevator car. An advantage is that the machinery can be added to the elevator shaft simply by adding the elevator shaft element comprising the machinery.

In an embodiment, the elevator shaft element comprising the machinery is fitted for use as the lowest element of an elevator shaft. An advantage is that the elevator can be put into service from very beginning of the construction of the building, and that the placement of the machinery needs not to be changed if number of the elements in the elevator shaft above the lowest element is changed.

In an embodiment, the elevator shaft element comprises a guiding wheel arrangement for at least partly carrying and guiding ropings of an elevator. An advantage is that the guiding wheel arrangement In an embodiment, the elevator arrangement comprises a guiding wheel arrangement for at least partly carrying and guiding a roping of the elevator is arranged in an upper part of the elevator shaft, and a machinery for driving moving elevator components is arranged in a lower part of the elevator shaft, below the guiding wheel arrangement. An advantage is that a complete elevator shaft, the height and configuration of which is easy to change may be constructed.

In an embodiment, the elevator arrangement comprises at least two elevator shaft elements attached one on top of the other, wherein the guiding wheel arrangement is arranged in an upmost elevator shaft element, and the machinery is arranged in a lowest elevator shaft element. An advantage is that a complete elevator shaft for high buildings in which the height and configuration is easy to change may be constructed.

In an embodiment, the elevator arrangement comprises an elevator car that is devoid of a roof and/or at least one side wall. An advantage is that capacity of the elevator arrangement for transporting large or long objects can be increased.

In an embodiment, the elevator car is provided with a conveyor, such as a roller conveyor, that is preferably motorized. An advantage is that moving of goods in or out the elevator car may be eased.

In an embodiment, the elevator arrangement comprises a first elevator shaft and a second elevator shaft arranged side by side, wherein the first elevator shaft has a right-hand configuration, where the opening for one or more landing doors is arranged closer to a right-side wall than a left-side wall of said elevator shaft, the second elevator shaft has a left-hand configuration, where the opening for one or more landing doors is arranged closer to a left-side wall than a right-side wall of said elevator shaft, and wherein the elevator shafts are positioned such that the right-side wall of the first elevator shaft and the left-side wall of the second elevator shaft are arranged facing each other. An advantage is that the width of a landing door opening in the building 27 may be minimized while the capacity of the elevator arrangement may be high.

In an embodiment of the elevator arrangement, one of the first and the second elevator shafts is arranged to be disassemblable while another of said elevator shafts is maintained operative. An advantage is that the capacity of the elevator arrangement can be taken down gradually.

In an embodiment, the method comprises arranging a number of the elevator shaft elements one after another until the required length of the elevator shaft has been reached, and prior to said arranging, removing an end wall of the transport and/or storage unit at least in an end to be connected to another transport and/or storage unit. An advantage is that the height of the elevator shaft can be extended step by step as needed.

In an embodiment, the method comprises arranging at least one stiffening beam to serve as or support to a threshold for a landing door opening being located above thereof, and/or a head for a landing door opening being located below thereof. An advantage is that the manufacturing of the elevator shaft can be simplified.

In an embodiment, the method comprises attaching the stiffening beam releasably with the frame module and providing a changeable adjustment of a height position for the stiffening beam according to the floor height of the building. An advantage is that manufacturing of correctly dimensioned elevator shafts may be simplified.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1A:
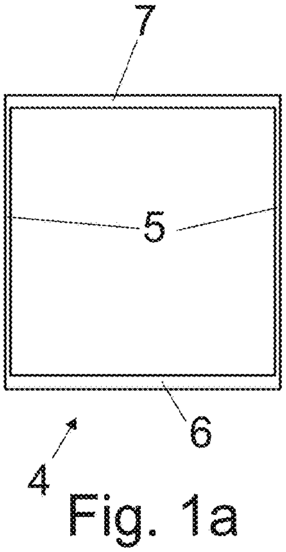
FIG. 1*a* is a schematic end view of a transport and/or storage unit.
Figure 1B:
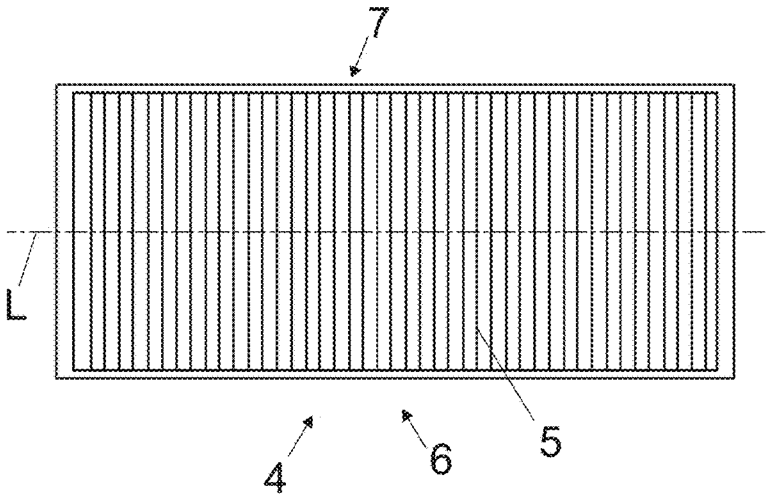
FIG. 1*b* is a schematic side view of the transport and/or storage unit shown in FIG. 1*a*.

FIG. 1*a* is a schematic end view of a transport and/or storage unit, and FIG. 1*b* is a schematic side view of the transport and/or storage unit shown in FIG. 1*a*.

According to an aspect of the invention, an elevator shaft is constructed from at least one element that comprise a frame module.

In an embodiment, the frame module is constructed from a transport and/or storage unit 4 that has a four-cornered cross-section and comprises two side walls 5, a bottom wall 6 and a roof wall 7, and preferably made of metal, such as steel. The outer surface of the side walls 5 may comprise corrugations (as shown in FIG. 1), but this is not an obligatory feature of the unit 4.

In an embodiment, the frame module is constructed from a shipping container. The shipping container may be e.g. an International Standards Organization (ISO) shipping container or some another intermodal container, mostly of either twenty or forty feet (6.1 or 12.2 m) standard length and having height of 8 feet 6 inches (2.6 m) or 9 feet 6 inches (2.9 m). The latter are known as High Cube or Hi-Cube (HC) containers. It is to be noted, however, that the container may have dimensions varying from those mentioned above.

In an embodiment, the transport and/or storage unit 4 from which the frame module is constructed is a unit of a site hut or another unit intended mainly for residential or office use. In this embodiment, the side walls 5, a bottom wall 6 and/or a roof wall 7 of the unit 4 may comprise openings (for door, window etc.) that are optionally closed when the module is prepared for use as the frame module, or alternatively utilized in manufacturing the frame module.

Figure 2:
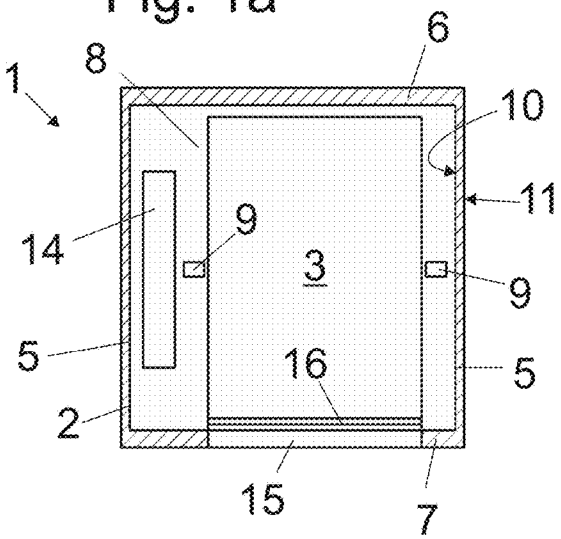
FIG. 2 is a schematic top view of an elevator in partial cross-section.

FIG. 2 is a schematic top view of a construction time use elevator in partial cross-section.

A frame module 2 of an elevator shaft element 1 is constructed from a transport and/or storage unit 4 described above. The unit 4 is arranged vertically such that the side walls 5, bottom wall 6 and upper wall 7 of the unit define an inner space 8 of the elevator shaft.

At least one elevator car guide 9 is attached to at least one of the side walls 5 for guiding movement of the elevator car 3 in the elevator shaft element 1. In an embodiment, the elevator car guide 9 is attached directly to the wall. In another embodiment, the elevator car guide 9 is attached to mounting brackets that are mounted to the wall. The attachment of the elevator car guide 9 may be realized by e.g. fixation means, such as bolts, or by welding.

The frame module 2 constitutes an inner perimeter 10 of a load bearing structure adapted for bearing the loads caused by operating the elevator. In an embodiment, the frame module 2 also constitutes an outer perimeter 11 of said load bearing structure. Said loads comprise not only loads of normal operating of the elevator, but also loads (often high ones) that incur in an emergency situation when gripping devices are activated for stopping the movement of the elevator car.

In an embodiment, the bottom and roof walls 6, 7 have a thicker, and stronger, structure than the side walls 5.

In an embodiment, such as shown in FIG. 2, the elevator 1 has its counterweight 14 arranged at side of the elevator car 3. This makes it possible to arrange an access to the elevator car 3 opposite sides thereof, which may be advantageous in some elevator arrangements. In another embodiment, the counterweight 14 is arranged back of the elevator car 3 relative to an opening 15 made for landing doors. The decision-making about which one of these two embodiments is selected depends on multiple factors.

In an embodiment, a door leaf 16 of a landing door is arranged in the opening 15. The door leaf is preferably of guillotine type, i.e. a leaf that moves in vertical direction.

In an embodiment, rails of the door leaf (not shown) are provided for heating system (not shown) for preventing potential problems being caused by low temperatures and humidity.

Figure 3:
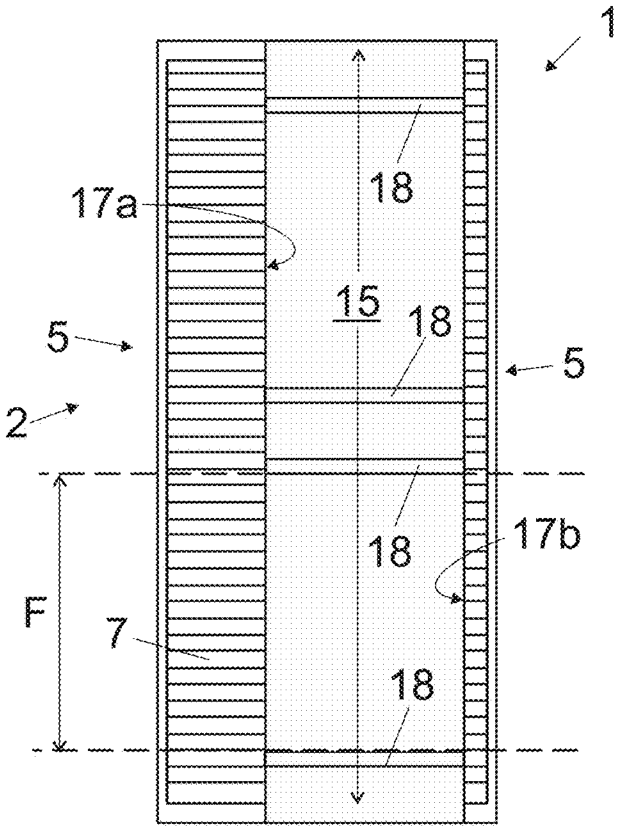
FIG. 3 is a schematic side view of an elevator shaft element.

FIG. 3 is a schematic side view of an elevator shaft element of a construction time use elevator. The elevator shaft element 1 comprises a frame module 2 that is arranged for receiving an elevator car 3 therein. The frame module 2 is constructed from a transport and/or storage unit 4 that comprises side walls 5, a bottom wall 6 and a roof wall 7. The unit 4 is arranged vertically such that said side walls 5, bottom wall 6 and roof wall 7 of the unit 4 define an inner space 8 of the elevator shaft. One of the side wall, the bottom wall or the roof wall is opened at a length more than a floor height F of a building for providing an opening 15 for one or more landing doors.

In an embodiment, such as shown in FIG. 3, the width of the opening 15 is less than the width of the wall provided with the opening. In another embodiment, the opening 15 is as broad as said wall, e.g. if the opening is made to the roof wall 7, the side-edges 17*a*, 17*b* of the opening lie at the side walls 5.

In an embodiment, such as shown in FIG. 3, the opening 15 extends over all the length of the transport and/or storage unit 4, i.e. from its first end to its second end.

In an embodiment, the opening 15 is arranged in the bottom wall 6 or the roof wall 7 of the transport and/or storage unit 4, preferably in the roof wall 7 as shown in FIG. 3.

The opening 15 has a first side-edge 17*a* and a second side-edge 17*b* that are parallel to longitudinal direction L of the transport and/or storage unit 4.

At least one stiffening beam 18 is arranged to the opening 15 extending from the first side-edge 17*a* to the second side-edge 17*b*. The beam is preferably perpendicular to the side-edges. The embodiment of the elevator shaft element 1 shown in FIG. 3 comprises four stiffening beams 18. It is to be noted, however, that there may be less or more than four beams 18 crossing the opening 15. One of the functions of the beam 18 is to stiffen the structure of the frame module.

In an embodiment, the beam 18 constructed from a profile beam or a box beam made of metal, such as a steel.

In an embodiment, such as shown in FIG. 3, all the beams have same dimensions. In another embodiment, there are differently dimensioned beams in the elevator shaft element 1.

In an embodiment, the stiffening beam 18 is arranged not only to stiffen the structure but also serve as a threshold for a landing door opening, or at least to support a separate threshold element.

In an embodiment, the stiffening beam 18 is arranged not only to stiffen the structure but also serve as a head of a landing door opening, or at least to support a separate head element.

Figure 10:
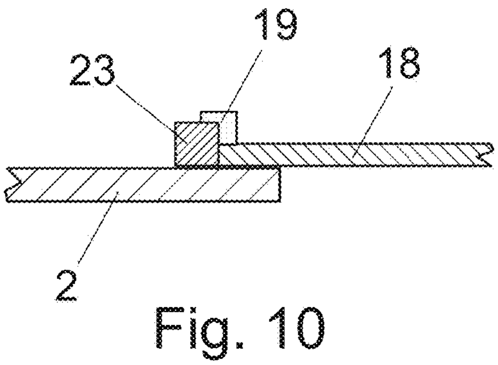
FIG. 10 is a schematic top view of a detail of an elevator shaft element in partial cross-section.

In an embodiment, the stiffening beam 18 comprises fixing means 19 (shown in FIG. 10) that allows a releasable attachment of the stiffening beam 18 with the frame module 2, and the frame module 2 comprises counter fixing means 23 that are arranged for receiving the fixing means 19.

The counter fixing means 23 may comprise e.g. a metal profile or beam attached to the frame module 2 parallel with the longitudinal direction L thereof.

The fixing means 19 may comprise e.g. a clamp or another type of detachable fixing means that provides an adjustment of a height position for the stiffening beam 18 according to the floor height F of the building. The adjustment may be implemented as a stepless adjustment or, alternatively, as an adjustment with steps.

In another embodiment, the stiffening beam 18 is simply attached directly to the wall of the frame module 2 using e.g. bolts. For instance, bolt holes are drilled in a suitable height in the wall, and bolts or threaded taps are fitted through the holes for attaching the stiffening beam 18.

Figure 4:
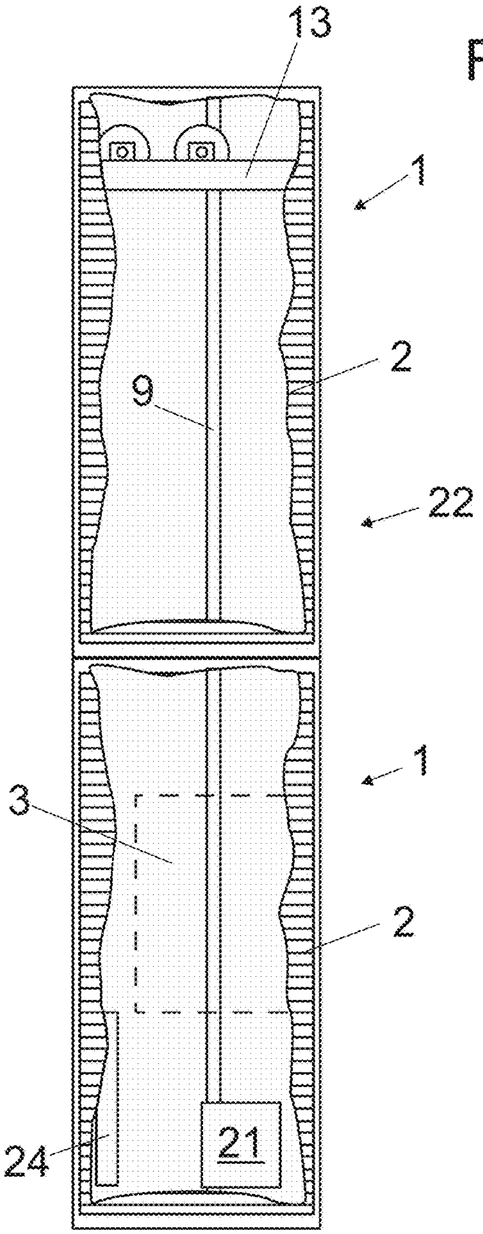
FIG. 4 is a schematic side view of an elevator shaft partially cut open.

FIG. 4 is a schematic side view of an elevator shaft of a construction time use elevator partially cut open.

In this embodiment, the elevator shaft 22 comprises two elevator shaft elements 1 arranged vertically and attached one on top of the other. In another embodiment, the elevator shaft 22 comprises more than two elevator shaft elements 1 arranged attached one on top of the other. In still another embodiment, the elevator shaft comprises just one elevator shaft element 1.

In an embodiment, such as shown in FIG. 4, all the elevator shaft elements 1 of the elevator shaft have an equal length. However, this is not always necessary; in other words, the elevator shaft 22 may comprise longer and shorter elevator shaft elements 1, constructed from e.g. a suitable mixture of twenty- and forty-feet shipping containers.

In an embodiment, the elevator shaft element 1 that is arranged lowest in the elevator shaft 22 comprises a machinery 21 for driving moving elevator components. The machinery 21 comprises an electric motor and a traction sheave driven by means of the electric motor. The moving elevator components comprises at least an elevator car 3, but typically also a counterweight 14.

In another embodiment, the machinery 21 is arranged in the upmost elevator shaft element.

In an embodiment, the elevator shaft element comprises a guiding wheel arrangement 24 that at least partly carries and guides ropings of the elevator. In an embodiment, said elevator shaft element is arranged in an upper part of the elevator shaft.

The guiding wheel arrangement 24 may comprise a supporting beam or frame 13 that is fixed releasably in the frame module 2, and the guiding wheel arrangement 24 can be released from a first location and fixed in another location in the elevator shaft 22. For example, if a further elevator shaft element 1 is attached on the elevator shaft 22, the guiding wheel arrangement 24 can be released and lifted to the new upmost elevator shaft element 1 and attached therein in a suitable location. In an embodiment, the supporting beam 13 is attached to the elevator car guide (s) 9. In an embodiment, the supporting beam 13 is attached to the wall (s) of the frame module.

In an embodiment, the guiding wheel arrangement 24 lies in the upper part of the elevator shaft, and the machinery 21 is arranged in the lower part of said elevator shaft, below the guiding wheel arrangement 24.

In an embodiment, the elevator shaft element 1 is provided with a lining (not shown) is arranged to cover at least partly the inner perimeter thereof. The lining may provide a sound or vibration reduction, for instance, and thus reduce inconvenience caused to the surroundings.

Figure 5:
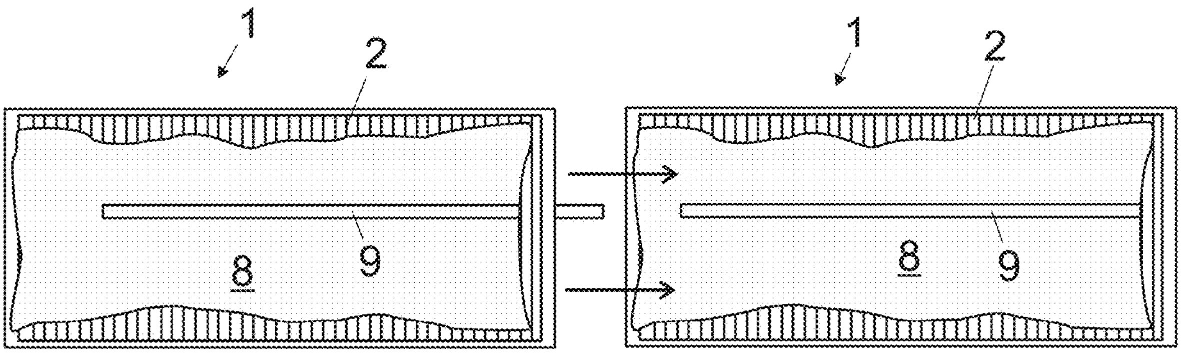
FIG. 5 is a schematic side view of a method.

FIG. 5 is a schematic side view of a step of a method for creating an elevator shaft of a construction time use elevator. In this step, two elevator shaft elements 1 are to be connected to each other. In some embodiments, this is all what is needed for creating an elevator shaft having the required length. In some other embodiments, at least one more elevator shaft element 1 is connected in the two elements shown in FIG. 5 in order to establish an elevator shaft so that the required length for the elevator shaft is reached. It is to be noted, however, that in some embodiments only one elevator shaft element 1 is needed for creating the desired elevator shaft.

End walls or end doors of the frame modules 2 are removed prior to connection of the elevator shaft elements 1, at least at the ends that are connected to each other. In an embodiment, end walls or end doors are removed from both ends of the element.

The openings 15 and further openings, if any, for doors, windows etc. are made in the frame module by e.g. cutting or flame cutting.

In an embodiment of the method, the elevator shaft 22 is pre-assembled in a plant, factory, manufacturing site or assembly plant, preferably indoors. If the elevator shaft 22 comprises more than one elevator shaft element 1, the elevator shaft elements 1 are temporarily arranged one after another in an order and position corresponding to an order and position of the elevator shaft elements 1 in a final building site of the elevator shaft 22.

In an embodiment of the pre-assembling, the elevator shaft elements 1 are fixed to each other, e.g. by similar means as in the final construction site. In another embodiment, it is used some other fixation methods or means, preferably allowing quick and easy disassembly of the elements.

In an embodiment of the pre-assembling, at least one assembly work step is carried out in the elevator shaft elements 1. For example, the elevator car guides 9 of at least two elevator shaft elements may be matched or vertically aligned to each other. Additionally or alternatively, other assembly work step (s) may be carried out, such as adding machinery components, doors, pulleys, ropings (e.g. on reels or pulleys), etc. Additionally, an elevator car can be arranged in the elevator shaft element in the pre-assembling.

Following the pre-assembling, the elevator shaft or the elements fixed to each other are disassembled into individual elements for transportation to the building site.

Figure 6:
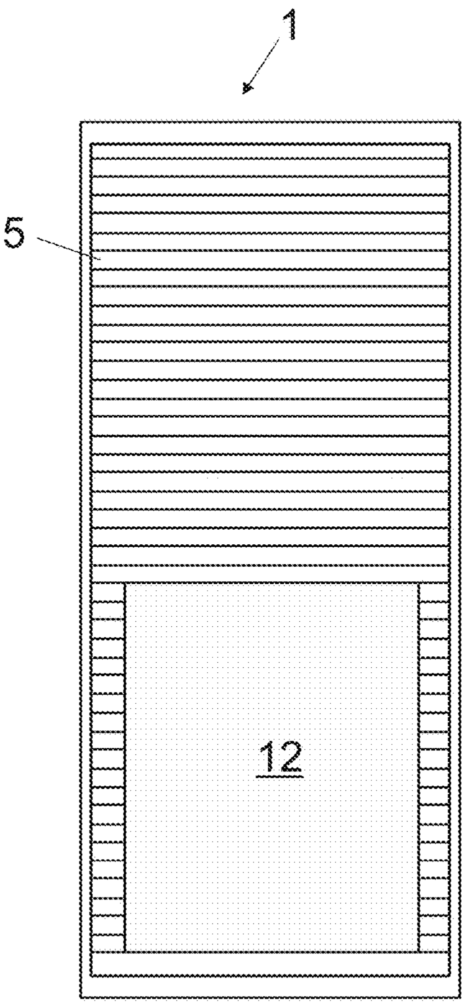
FIG. 6 is a schematic side view of another elevator shaft element.

FIG. 6 is a schematic side view of another elevator shaft element for a construction time use elevator.

In an embodiment, the elevator shaft element 1 comprises a loading door 12 that is preferably arranged so that the loading door 12 is on opposite side of the elevator shaft element in relation to the opening 15. However, the loading door may be placed some other way, too.

In an embodiment, the elevator shaft element 1 provided with the loading door 12 is intended for the lowest element in the elevator shaft 22.

The loading door 12 allows entry and exit of goods and/or passengers in the elevator car on e.g. ground level.

The loading door 12 is preferably provided with a door leaf (not shown).

Figure 7:
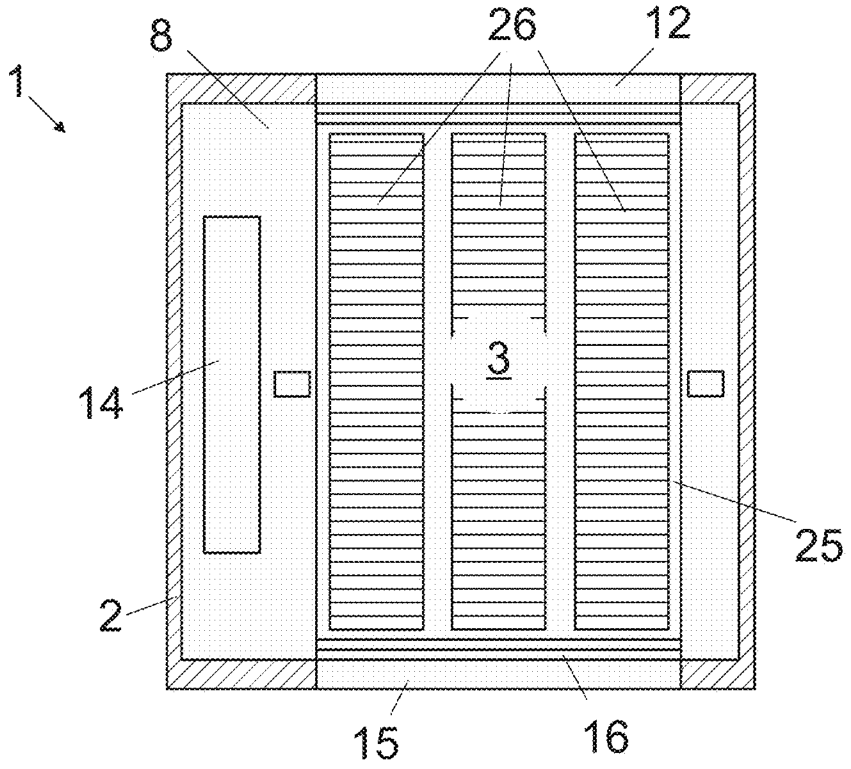
FIG. 7 is a schematic top view of a second elevator in partial cross-section.

FIG. 7 is a schematic top view of a second construction time use elevator in partial cross-section. In an embodiment, the elevator car 3 comprises a floor 25, two side walls, two end walls of which at least one is provided with a car door opening, and a roof. The structure of said floor, side walls, end walls and/or roof may be solid or at least partly open, it may comprise e.g. a meshwork structure.

In an embodiment, the elevator car 3 is devoid of a roof and/or at least one side wall, i.e. the elevator car can be just an installation platform. The embodiment shown in figure 7 is devoid of the roof and the side walls. The roofless structure allows to transport long items in the elevator car. In an embodiment, the elevator car comprises an opening in the roof or floor. This is another way to allow transportation of long items in the elevator car.

In an embodiment, such as shown in FIG. 7, the floor 25 of the elevator car is provided with a conveyor 26. The conveyor type may be e.g. a roller conveyor. The conveyor is preferably motorized.

Figure 8:
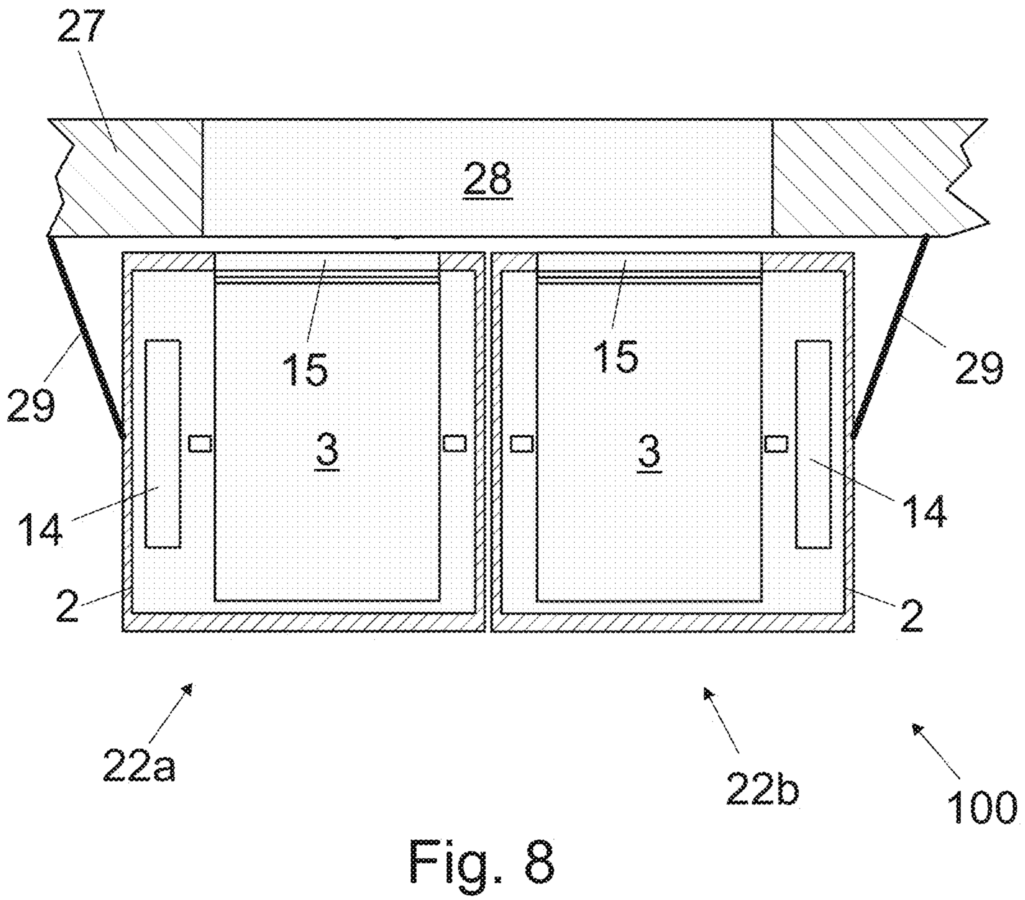
FIG. 8 is a schematic top view of a third elevator in partial cross-section.

FIG. 8 is a schematic top view of a third construction time use elevator in partial cross-section. In an embodiment, the elevator arrangement 100 comprises two or more elevator shafts 22 arranged side by side.

In an embodiment, such as shown in FIG. 8, the elevator arrangement 100 comprises two shafts, each of which provided with a counterweight 14 that is arranged at a side of the elevator car 3. The elevator arrangement may be arranged on outer wall of a building 27 that is under construction. A first elevator shaft 22*a* has a right-hand configuration, where the opening 15 for one or more landing doors is arranged closer to a right-side wall than a left-side wall of said elevator shaft. A second elevator shaft 22*b* has a left-hand configuration, i.e. reversed configuration to the first elevator shaft, where the opening 15 is arranged closer to a left-side wall than a right-side wall of said elevator shaft. The elevator shafts 22*a*, 22*b* are positioned such that the right-side wall of the first elevator shaft and the left-side wall of the second elevator shaft are arranged facing each other. This makes it possible to minimize width of a landing door opening 28 needed in the building 27.

In an embodiment of the elevator arrangement 100 comprising two or more elevator shafts 22*a*, 22*b*, at least one of the elevator shafts is configured for passenger transportation and at least one for goods transportation. In another embodiment, all the elevator shafts 22*a*, 22*b* are configured for passenger transportation. In still another embodiment, all the elevator shafts 22*a*, 22*b* are configured for goods transportation. In an embodiment, the purpose of use of the elevator shaft may be changed from a goods transportation to a passenger transportation, or vice versa.

In an embodiment of the elevator arrangement 100 comprising two or more elevator shafts 22*a*, 22*b*, the shafts are constructed such that one (or more) of the elevator shafts can be disassembled while rest of the elevator shafts is/are maintained operative. For that reason, the elevator shafts 22*a*, 22*b* may be supported individually e.g. by backstays 29 to the building 27. The backstay may comprise e.g. a stiff support element, such as a bar or a plate structure, and/or a flexible element, such as a cable.

In an embodiment, such as shown in FIG. 8, the elevator arrangement 100 comprising one or more shafts, is arranged on outer wall of the building. In another embodiment, the elevator arrangement is arranged inside the building. In a third embodiment, the elevator shaft is arranged at a distance from the building and connected to said building by access bridges (not shown). The access bridges connect the landing doors of the elevator to the floors of the building.

Figure 9:
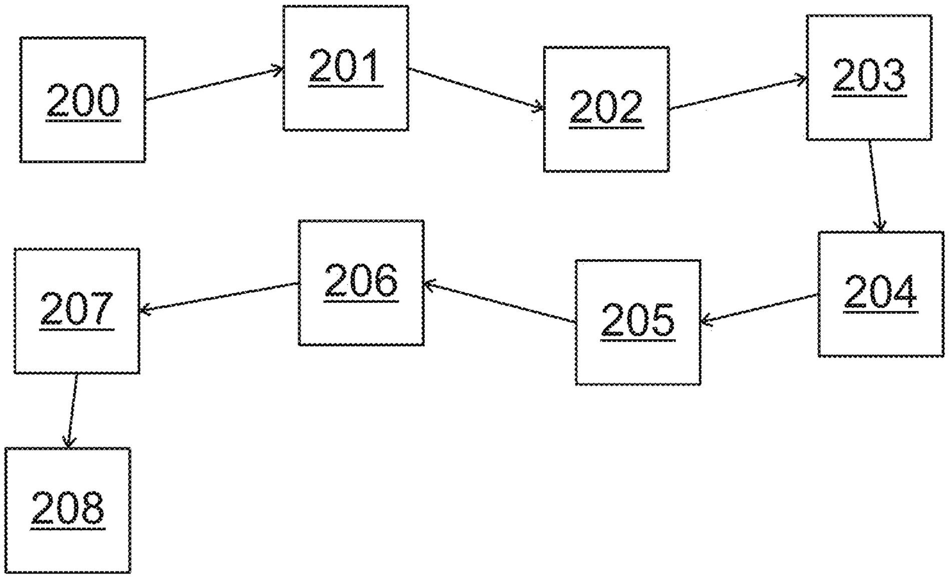
FIG. 9 illustrates a method for constructing an elevator shaft.

FIG. 9 illustrates a method for constructing an elevator shaft for a construction time use elevator.

In the method, it is prefabricated 200 elevator shaft elements 1 that comprise a frame module 2. The frame module 2 is constructed from a transport and/or storage unit 4 comprising side walls 5, a bottom wall 6 and a roof wall 7.

The side wall, the bottom wall or the upper wall of the transport and/or storage unit is opened 201 at a length more than a floor height of a building for providing an opening (15) for one or more landing doors, the opening having a first side-edge 17*a* and a second side-edge 17*b* parallel to longitudinal direction L of the transport and/or storage unit 4.

The method further comprises arranging 202 at least one stiffening beam 18 to the opening, said stiffening beam extending from the first side-edge to the second side-edge for stiffening the structure of the frame module.

In an embodiment, the method comprises arranging 203 at least one stiffening beam 18 to serve as or support to a threshold for a landing door opening being located above thereof, and/or a head for a landing door opening being located below thereof. In an embodiment, the stiffening beam 18 is attached 204 releasably with the frame module 1, and a changeable adjustment of a height position of the stiffening beam 18 according to the floor height of the building is provided 205.

In an embodiment, the method comprises removing 206 an end wall of the transport and/or storage module at least in an end to be connected to another transport and/or storage module, and then arranging 207 a number of said elevator shaft elements 1 one after another until the required length of the elevator shaft has been reached.

In an embodiment, at least some of the method steps are realized in a preliminary assembling of the elevator shaft in a plant, factory, manufacturing site or assembly plant. Following the preliminary assembling, the pre-assembled elevator shaft or shaft part is disassembled for transportation to a building site. This step may comprise e.g. disconnection of elevator shaft elements connected to each other.

In an embodiment, the preliminary assembling comprises vertical alignment of the elevator car guides 9 of at least two elevator shaft elements to each other. The "vertical alignment" does not necessitate that the at least two elevator shaft elements are in vertical position, i.e. in the position of the elevator shaft; alternatively, the at least two elevator shaft elements connected to each other may be e.g. in horizontal position during the vertical alignment.

In an embodiment, the preliminary assembling comprises arranging e.g. door leaf (s) 16 in the opening 15, providing the elevator shaft element with a machinery, providing the elevator shaft element with roping, etc.

Finally, the method comprises, on the building site, arranging 208 a number of the elevator shaft elements 1 one after another until the required length for the elevator shaft 22 has been reached. It is to be noted, however, that in some embodiments just one elevator shaft element 1 is needed for reaching the required length for the elevator shaft 22.

In an embodiment, the elevator shaft elements 1 are handled on the building site with a crane that has a lifting tool suitable for attaching to the elevator shaft element 1 lying in a horizontal position on a truck, lifting and turning the elevator shaft element in a vertical position, and moving the element in its correct place.

It is to be noted that the order of the method steps may deviate from the order described above.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 elevator shaft element
2 frame module
3 elevator car

4 transport and/or storage unit
5 side wall
6 bottom wall
7 roof wall
8 inner space
9 elevator car guide
10 inner perimeter
11 outer perimeter
12 loading door
13 supporting beam
14 counterweight
15 opening
16 door leaf
17*a, b* side-edge
18 stiffening beam
19 fixing means
20 safety control system
21 machinery
22*a, b* elevator shaft
23 counter fixing means
24 guiding wheel arrangement
25 car floor
26 conveyor
27 building
28 landing door opening
29 backstay
100 elevator arrangement
200-208 method steps
F floor height
L longitudinal direction

The invention claimed is:

1. An elevator shaft element of a construction time use elevator, the elevator shaft element comprising:

a frame module arranged for receiving an elevator car therein, the frame module being constructed from a transport and/or storage unit, the transport and/or storage unit including side walls, a bottom wall and an upper wall, the transport and/or storage unit being arrangeable vertically such that said side walls, bottom wall and upper wall of the transport and/or storage unit define an inner space of an elevator shaft, wherein a wall of the side walls, the bottom wall, or the upper wall of the transport and/or storage unit is opened at a length more than a floor height of a building such that the wall includes an opening for one or more landing doors, the opening having a first side-edge and a second side-edge parallel to longitudinal direction of the transport and/or storage unit; and at least one stiffening beam arranged to be fixed to the opening and extending from the first side-edge to the second side-edge, wherein the at least one stiffening beam comprises fixing means configured to enable a releasable attachment of the stiffening beam with the frame module, and the frame module includes counter fixing means configured to receive the fixing means, such that the elevator shaft element is configured to enable a stepless adjustment of a height position of the at least one stiffening beam according to the floor height of the building.

2. The elevator shaft element as claimed in claim 1, wherein the frame module is constructed from a shipping container.

3. The elevator shaft element as claimed in claim 1, wherein the opening extends over an entire length of the transport and/or storage unit, and a width of the opening is smaller than a width of the wall that includes the opening.

4. The elevator shaft element as claimed in claim 1, wherein the at least one stiffening beam is arranged to serve as or support to a threshold for a landing door opening being located above thereof, and/or a head for a landing door opening being located below thereof.

5. An elevator arrangement of a construction time use elevator, the elevator arrangement comprising:

at least one shaft element as claimed in claim 1 for creating an elevator shaft, and at least one elevator car.

6. The elevator arrangement as claimed in claim 5, wherein a guiding wheel arrangement for at least partly carrying and guiding a roping of the construction time use elevator is arranged in an upper part of the elevator shaft, and a machinery for driving moving elevator components is arranged in a lower part of the elevator shaft, below the guiding wheel arrangement.

7. The elevator arrangement as claimed in claim 6, comprising at least two elevator shaft elements attached one on top of another, wherein the guiding wheel arrangement is arranged in an upmost elevator shaft element of the at least two elevator shaft elements, and the machinery is arranged in a lowest elevator shaft element of the at least two elevator shaft elements.

8. The elevator arrangement as claimed in claim 5, wherein a car floor of the elevator car is provided with a conveyor that is motorized.

9. An elevator arrangement of a construction time use elevator, the elevator arrangement comprising:

a first elevator shaft and a second elevator shaft arranged side by side, wherein the first elevator shaft has a right-hand configuration, where an opening for one or more landing doors of the first elevator shaft is arranged closer to a right-side wall of said first elevator shaft than a left-side wall of said first elevator shaft, the second elevator shaft has a left-hand configuration, where an opening for one or more landing doors of the second elevator shaft is arranged closer to a left-side wall of said second elevator shaft than a right-side wall of said second elevator shaft, and the first and second elevator shafts are positioned such that the right-side wall of the first elevator shaft and the left-side wall of the second elevator shaft are arranged facing each other; and at least one elevator car, wherein each of the first elevator and the second elevator shaft includes at least one shaft element, each separate shaft element including a frame module arranged for receiving a separate elevator car therein, the frame module being constructed from a transport and/or storage unit, the transport and/or storage unit including side walls, a bottom wall and an upper wall, the transport and/or storage unit being arrangeable vertically such that said side walls, bottom wall and upper wall of the transport and/or storage unit define an inner space of an elevator shaft, wherein a wall of the side walls, the bottom wall, or the upper wall of the transport and/or storage unit is opened at a length more than a floor height of a building such that the wall includes an opening for one or more landing doors, the opening having a first side-edge and a second side-edge parallel to longitudinal direction of the transport and/or age unit, and at least one stiffening beam arranged to be fixed to the opening and extending from the first side-edge to the second side-edge.

10. The elevator arrangement as claimed in claim 9, wherein one of the first and the second elevator shafts is arranged to be disassemblable while another of the first and the second elevator shafts is maintained operative.

11. A method for constructing an elevator shaft of a construction time use elevator, the method comprising:

prefabricating elevator shaft elements, for shaft element of the elevator shaft elements including a frame module constructed from a transport and/or storage unit, the transport and/or storage unit including side walls, and a bottom wall and an upper wall;

opening a wall of the side walls, the bottom wall, or the upper wall of the transport and/or storage unit at a length more than a floor height of a building such that the wall includes an opening for one or more landing doors, the opening having a first side-edge and a second side-edge parallel to longitudinal direction of the transport and/or storage unit, and arranging at least one stiffening beam to the opening extending from the first side-edge to the second side-edge for stiffening a structure of the frame module, the arranging in in attaching the at e stiffening beam releasably with the frame module, wherein the at least one stiffening beam comprises fixing means configured to enable a releasable attachment of the stiffening beam with the frame module, and wherein the frame module includes counter fixing means configured to receive the fixing means, such that each elevator shaft element is configured to enable a stepless adjustment of a height position of the at least one stiffening beam according to the floor height of the building.

12. The method as claimed in claim 11, comprising arranging a number of said elevator shaft elements one after another until a required length of the elevator shaft has been reached, and prior to said arranging, removing an end wall of the transport and/or storage unit at least in an end to be connected to another transport and/or storage unit.

13. The method as claimed in claim 11, comprising arranging said at least one stiffening beam to serve as or support to a threshold for a landing door opening being located above thereof, and/or a head for a landing door opening being located below thereof.

14. The method as claimed in claim 11, comprising providing a changeable adjustment of the height position for the east one stiffening beam according to the floor height of the building.

* * * * *